(No Model.)
J. W. HICKS.
MACHINE FOR CUTTING CIRCLES.
No. 290,882. Patented Dec. 25, 1883.
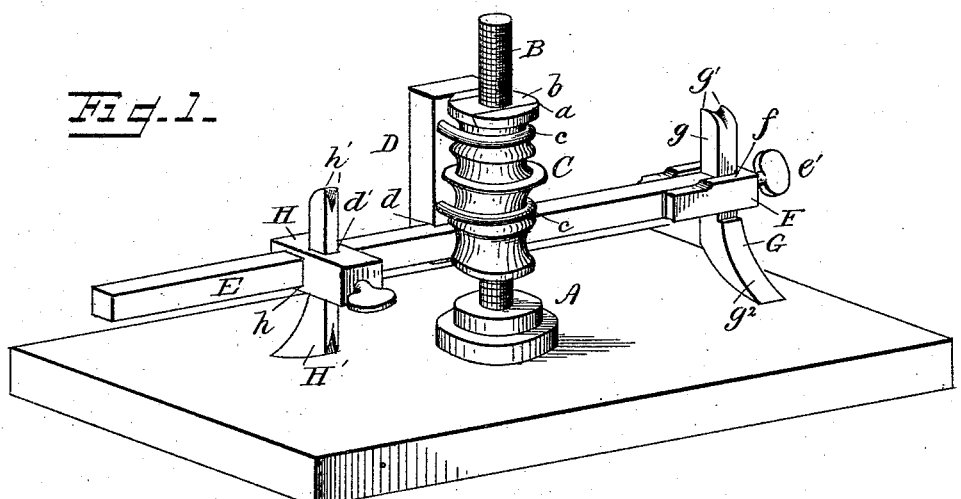
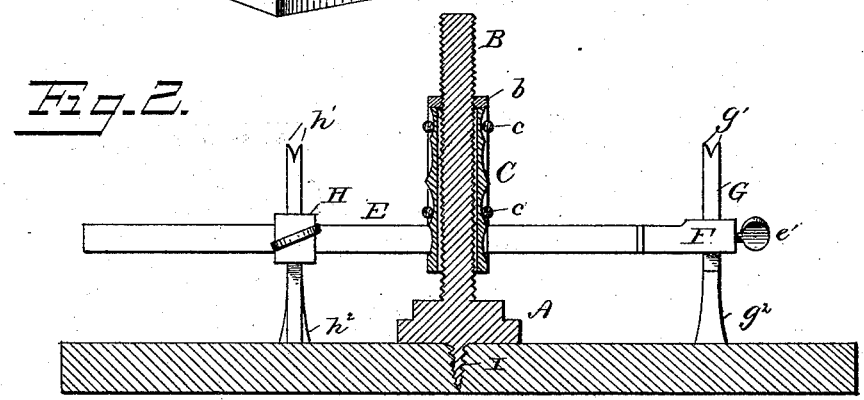
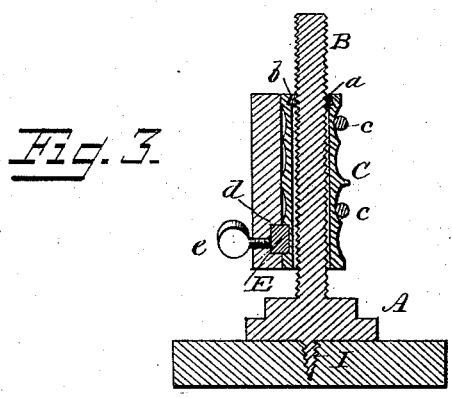
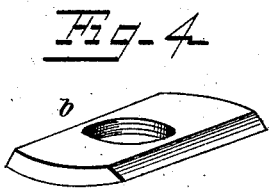
WITNESSES
F. L. Durand.
C. H. Dashiell
John W. Hicks
INVENTOR
by C. A. Knowles
Attorney

UNITED STATES PATENT OFFICE.

JOHN WATERS HICKS, OF WINONA, MISSISSIPPI.

MACHINE FOR CUTTING CIRCLES.

SPECIFICATION forming part of Letters Patent No. 290,882, dated December 25, 1883.

Application filed October 29, 1883. (No model.)

*To all whom it may concern:*

Be it known that I, JOHN W. HICKS, a citizen of the United States, residing at Winona, in the county of Montgomery and State of Mississippi, have invented a new and useful Machine for Cutting Out Circles, &c., of which the following is a specification, reference being had to the accompanying drawings.

My invention relates to a device for cutting circles and segments of wood and like material, the object being to provide a device of this character which shall possess superior advantages in simplicity, durability, and general efficiency.

With these ends in view the invention consists, broadly, in the combination, with a standard, of a sleeve mounted thereon and carrying an adjustable bar having suitably-arranged adjustable cutters.

In the drawings, Figure 1 represents a perspective view of my device in position for operation. Fig. 2 is a vertical longitudinal section of the same. Fig. 3 is a transverse vertical section, and Fig. 4 is a detail view of the dovetailed portion of the sleeve or collar detached.

A represents a base, preferably made of metal, and having rigidly secured thereto a standard, B, which is screw-threaded, as shown.

C represents a sleeve adapted to receive the standard B. The upper portion, $a$, of this sleeve C is dovetailed to receive a correspondingly-dovetailed nut, $b$. The inner surface of the sleeve or collar is plain, and the dovetailed nut which is secured thereto is interiorly screw-threaded and forms the feed. By this arrangement, when the nut becomes worn it may be replaced by a new one with but little trouble and expense.

D represents a block, which is secured to the sleeve C by means of clips $c\ c$, resting in annular grooves formed on said sleeve. The lower end of this block D is formed with a slot, $d$, on its inner face, to receive a bar, E, which rests in said slot and bears against the sleeve C. Said bar is longitudinally adjustable, and may be retained in any desired position by means of a thumb-screw, $e$, working in said block. One end of the bar E is provided with a bracket, F, having a vertical perforation, $f$, to receive a cutter, G. The end of this bracket is provided with a screw-threaded perforation or opening to receive a set-screw, $e'$, by means of which the cutter is held vertically adjustable. This cutter G consists of a shank, $g$, channeled or recessed at its upper end, to form cutting-edges $g'$, and formed at its lower end with a cutter or gouge, $g^2$.

H represents a block, which is formed with a transverse perforation, $h$, to receive the bar E, and with a vertical perforation, $d'$, to receive a cutter, H', which is of the same construction as the one hereinbefore described. One end of this block is formed with a screw-threaded perforation extending to the vertical perforation $h'$, to receive a set-screw, by means of which the block H can be longitudinally adjusted upon the bar E and the cutter vertically adjusted relative to the block H. This block carrying the cutter may be arranged upon the opposite end of the bar from the cutter G; or the bar may be withdrawn from the block D and the cutter H' arranged upon the same end of the bar as the cutter G.

The operation of my device is as follows: The screw-threaded standard is secured to the material to be operated upon by means of a wood-screw, I, extending downwardly from the base A. The sleeve C, carrying the bar E, is then placed upon said standard, the bar E longitudinally adjusted, as may be desired, and the cutters G and H' may then be inverted, with the cutting-edges $g'$ and $h'$ turned down. The bar E is then turned or revolved upon the screw-threaded standard, thus feeding the cutters downwardly, and causing them to cut or groove the material, to prevent the "chipping" of the wood when the cutters are used.

When the grooves have been formed, the cutters may be reversed, adjusted, and secured by means of the set-screws, and upon the bar being turned, will cut the material thoroughly and effectively.

In operating upon soft wood—such as pine—a screw-threaded standard may be used having a greater pitch or a coarser thread than when hard wood is to be cut. In the latter case a standard should be used having a fine thread, and a screw-threaded nut should be used having a correspondingly fine thread.

This device is particularly adapted for making fellies for wheels. The cutters may be adjusted on one side of the bar a distance apart equal to the width of the felly to be made, or the cutter H' may be adjusted on the opposite side of the bar E to describe a lesser circle or segment than the cutter G.

Many slight changes in the details of construction may be resorted to without departing from the spirit of my invention; hence I would have it understood that I reserve to myself the right to make all such changes and alterations in the details of construction as may properly fall within the scope of my invention.

Having fully described my invention, what I claim as new, and desire to secure by Letters Patent, is—

1. The combination, with a screw-threaded standard, of a sleeve loosely mounted to revolve thereon, and a bar removably secured to said sleeve and carrying adjustable cutters, whereby the cutters, as they descend into the wood, are fed downwardly by the sleeve, substantially as set forth.

2. The combination, with a suitable standard, of a sleeve loosely mounted to revolve thereon, a block secured to said sleeve by means of clips and provided with a slot or groove, and a longitudinally-adjustable bar carrying cutters secured between said block and sleeve, substantially as set forth.

3. The combination of a screw-threaded standard secured to a suitable base, a sleeve provided with annular grooves loosely mounted on said standard, a block secured to said sleeve and provided with a slot or groove, and a set-screw with a rod carrying adjustable cutters secured in said slot between said block and sleeve, and longitudinally adjustable by means of said set-screw, substantially as set forth.

4. The combination, with a screw-threaded standard secured to a suitable base, of a sleeve loosely mounted thereon and dovetailed at its upper end, a dovetailed nut fitted in said recess, and a bar carrying adjustable cutters, substantially as set forth.

5. The combination, with a screw-threaded standard secured to a suitable base, having a screw secured to its under side, of a sleeve loosely mounted on said standard, a block secured to said sleeve by means of clips, said block having a slot or groove, and a screw-threaded perforation to receive a set-screw, a bar mounted between said block and sleeve, and longitudinally adjustable by means of said set-screw, and adjustable cutters mounted on said bar, substantially as set forth.

6. The combination, with the screw-threaded standard and sleeve loosely mounted thereon, of an adjustable bar removably secured to said sleeve, a bracket secured to the end of said rod and provided with a vertical perforation to receive a cutter, and a set-screw arranged at the end of said bracket, by means of which the cutter is vertically adjusted, substantially as set forth.

7. The combination, with a screw-threaded standard and sleeve loosely mounted thereon, of a longitudinally-adjustable bar removably secured to said sleeve, a block mounted on said bar and formed with a transverse and a vertical perforation adapted to receive a cutter, a set-screw working in a screw-threaded perforation at the end of said block, by means of which the block may be longitudinally adjusted, and the vertically-adjustable cutter, substantially as set forth.

8. The combination, with a screw-threaded standard and a sleeve loosely mounted thereon, of a longitudinally-adjustable bar removably secured thereto, a bracket formed with a vertical perforation secured to one end of said bar, a block mounted on said bar and formed with a transverse and a vertical perforation, and vertically-adjustable cutters secured in said block and bracket by means of set-screws, substantially as set forth.

In testimony that I claim the foregoing as my own I have hereto affixed my signature in presence of two witnesses.

JOHN WATERS HICKS.

Witnesses:
W. P. ATKINS,
JOSEPH WOLF.